United States Patent
Truong et al.

(10) Patent No.: US 8,616,666 B2
(45) Date of Patent: Dec. 31, 2013

(54) MULTICOLOR ELECTRONIC DEVICES AND PROCESSES OF FORMING THE SAME BY PRINTING

(75) Inventors: Nugent Truong, Ventura, CA (US); Matthew Stainer, Goleta, CA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 285 days.

(21) Appl. No.: 12/746,984

(22) PCT Filed: Dec. 10, 2008

(86) PCT No.: PCT/US2008/086150
§ 371 (c)(1),
(2), (4) Date: Aug. 26, 2010

(87) PCT Pub. No.: WO2009/076396
PCT Pub. Date: Jun. 18, 2009

(65) Prior Publication Data
US 2011/0026045 A1 Feb. 3, 2011

Related U.S. Application Data

(60) Provisional application No. 61/012,601, filed on Dec. 10, 2007.

(51) Int. Cl.
*B41J 29/38* (2006.01)
*B41J 2/15* (2006.01)
*B41J 2/14* (2006.01)
*B05D 5/12* (2006.01)
*B05D 5/06* (2006.01)

(52) U.S. Cl.
USPC ....... 347/9; 347/40; 347/47; 427/58; 427/162

(58) Field of Classification Search
USPC .............................. 347/9, 40, 47; 427/58, 162
See application file for complete search history.

(56) References Cited

U.S. PATENT DOCUMENTS

| | | |
|---|---|---|
| 5,592,202 A | 1/1997 | Erickson |
| 6,655,783 B2 | 12/2003 | Otsuki |

(Continued)

FOREIGN PATENT DOCUMENTS

| | | |
|---|---|---|
| CN | 1605465 A | 4/2005 |
| CN | 1994739 A | 7/2007 |

(Continued)

OTHER PUBLICATIONS

CRC Handbook of Chemistry and Physics, 81st Edition (2000-2001) (Book Not Included).

(Continued)

*Primary Examiner* — Jannelle M Lebron

(57) ABSTRACT

There is provided a method of printing a regular array of rows of subpixels on a workpiece. The subpixels have c different colors and have a subpixel pitch s. A printing head has z nozzles arranged in a row with a spacing p, where $z=n_1(c)$ and $p=n_2(s)$, the printhead being at a first position relative to the workpiece. There are c different printing inks, one for each of the c colors, and each of the printing inks is supplied to the nozzles in a regular alternating pattern. The method includes steps of printing a first set of z rows of subpixels with the printing head; moving the workpiece laterally relative to the printing head by a distance $d_1$, where $d_1=n_3(s)$; printing a second set of z rows of subpixels with the printing head; repeating the printing steps for a total of $n_2$ sets of z rows of subpixels. Variables include:

c, an integer greater than 1;

$n_1$, $n_2$, and $n_3$ which are the same or different and are independently selected from integers greater than 0, with the proviso that $n_2$ is not a multiple of c.

10 Claims, 22 Drawing Sheets

(56) References Cited

U.S. PATENT DOCUMENTS

| | | |
|---|---|---|
| 6,670,645 B2 | 12/2003 | Grushin et al. |
| 6,758,550 B2 | 7/2004 | Ito et al. |
| 7,067,170 B2 | 6/2006 | Marcus et al. |
| 7,188,919 B2 | 3/2007 | Satomura |
| 7,296,868 B2 | 11/2007 | Shibata et al. |
| 7,381,444 B2 | 6/2008 | Shigemura et al. |
| 7,459,177 B2 | 12/2008 | Kimura et al. |
| 2003/0108804 A1 | 6/2003 | Cheng et al. |
| 2006/0121370 A1 | 6/2006 | Kim et al. |
| 2006/0228469 A1 | 10/2006 | Shigemura et al. |
| 2006/0290732 A1 | 12/2006 | Park et al. |
| 2007/0190233 A1 | 8/2007 | Chung |
| 2007/0296796 A1 | 12/2007 | Lee et al. |
| 2008/0024552 A1 | 1/2008 | White et al. |
| 2008/0067924 A1 | 3/2008 | Prakash et al. |
| 2008/0157659 A1 | 7/2008 | Prakash |
| 2009/0004376 A1 | 1/2009 | Lee |
| 2010/0279081 A1 | 11/2010 | Koele et al. |
| 2011/0181899 A1 | 7/2011 | Stainer et al. |
| 2011/0298863 A1 | 12/2011 | Truong et al. |
| 2012/0044512 A1 | 2/2012 | Truong et al. |
| 2012/0045568 A1 | 2/2012 | Truong et al. |

FOREIGN PATENT DOCUMENTS

| | | |
|---|---|---|
| JP | 04263949 A | 9/1992 |
| JP | 07025036 A | 1/1995 |
| JP | 08300694 A | 11/1996 |
| JP | 09138306 A | 5/1997 |
| JP | 11048503 A | 2/1999 |
| JP | 2001185355 A | 7/2001 |
| JP | 2003084125 A | 3/2003 |
| JP | 2003117460 A | 4/2003 |
| JP | 2004358314 A | 12/2004 |
| JP | 2005087801 A | 4/2005 |
| JP | 2005111727 A | 4/2005 |
| JP | 2005309160 A | 11/2005 |
| JP | 2007256312 A | 10/2007 |
| JP | 2007264378 A | 10/2007 |
| JP | 2007271812 A | 10/2007 |
| JP | 2008197149 A | 8/2008 |
| JP | 2011507190 A | 3/2011 |
| KR | 1020060064784 A | 6/2006 |
| KR | 100759838 B1 | 9/2007 |
| WO | 03008424 A1 | 1/2003 |
| WO | 03040257 A1 | 5/2003 |
| WO | 03063555 A1 | 7/2003 |
| WO | 03091688 A2 | 11/2003 |
| WO | 2004016710 A1 | 2/2004 |
| WO | 2007145979 A2 | 12/2007 |
| WO | 2009076396 A1 | 6/2009 |
| WO | 2010102274 A2 | 9/2010 |

OTHER PUBLICATIONS

International Preliminary Report on Patentability, The International Bureau of WIPO, Geneva, CH, in PCT/US2008/086150, the PCT counterpart of the present application, Yoshiko Kuwahara, Authorized Officer, Jun. 15, 2010.

PCT International Search Report for Application No. PCT/US2008/086150, counterpart to U.S. Appl. No. 12/746,984; Young, Lee W., Authorized Officer; Feb. 6, 2009.

PCT International Search Report for Application No. PCT/US2009/06140, counterpart to U.S. Appl. No. 13/122,215; Kim Ju Seung, Authorized Officer; May 25, 2010.

PCT International Search Report for Application No. PCT/US2010/026469, counterpart to U.S. Appl. No. 13/202,235; Han Man Yeol, Authorized Officer; Oct. 15, 2010.

PCT International Search Report for Application No. PCT/US2010/037231, counterpart to U.S. Appl. No. 13/266,322; Kim, Chang Gyun, Authorized Officer; Dec. 13, 2010.

PCT International Search Report for Application No. PCT/US2010/037247, counterpart to U.S. Appl. No. 13/318,563; Kim Chang Gyun, Authorized Officer; Dec. 13, 2010.

Extended European Search report for Application No. EP10784080.3, counterpart to U.S. Appl. No. 13/266,322; Aug. 8, 2013.

Extended European Search report for Application No. EP10784090.2, counterpart to U.S. Appl. No. 13/318,563; Aug. 16, 2013.

| Printer |
|---|
| Color M1 |
| Color M2 |
| Color M1 |
| Color M2 |

| Print # | 1 | 2 | 3 | 4 | 5 | 6 | 7 | 8 | 9 | 10 | 11 | 12 |
|---|---|---|---|---|---|---|---|---|---|---|---|---|
| A1 | M1 | | | | | | | | | | | |
| A2 | | M1 | | | | | | | | | | |
| A3 | M2 | | | | | | | | | | | |
| | | | M1 | | | | | | | | | |
| | | M2 | | | | | | | | | | |
| | | | | M1 | | | | | | | | |
| B1 | | M2 | | | | | | | | | | |
| B2 | | | M1 | | | | | | | | | |
| B3 | | | M2 | | | | | | | | | |
| | | | | M1 | | | | | | | | |
| | | | | M2 | | | | | | | | |
| | | | | | M1 | | | | | | | |
| | | | | | M2 | | | | | | | |
| | | | | | | M1 | | | | | | |
| | | | | | | M2 | | | | | | |

| Pattern | Subpixel Row |
|---|---|
| Color M1 row | 1 |
| Color M2 row | 2 |
| Color M1 row | 3 |
| Color M2 row | 4 |
| Color M1 row | 5 |
| Color M2 row | 6 |
| Color M1 row | 7 |
| Color M2 row | 8 |
| Color M1 row | 9 |
| Color M2 row | 10 |
| Color M1 row | 11 |
| Color M2 row | 12 |
| Color M1 row | 13 |
| Color M2 row | 14 |
| Color M1 row | 15 |
| Color M2 row | 16 |
| Color M1 row | 17 |
| Color M2 row | 18 |
| Color M1 row | 19 |
| Color M2 row | 20 |
| Color M1 row | 21 |
| Color M2 row | 22 |

| Print # | 1 | 2 | 3 | 4 | 5 | 6 | 7 | 8 | 9 | 10 | 11 | 12 | | Pattern | Subpixel Row |
|---|---|---|---|---|---|---|---|---|---|---|---|---|---|---|---|
| C1 | | | | | | M1 | | | | | | | | Color M1 row | 23 |
| | | | | | M2 | | | | | | | | | Color M2 row | 24 |
| | | | | | | M1 | | | | | | | | Color M1 row | 25 |
| | | | | | | M2 | | | | | | | | Color M2 row | 26 |
| | | | | | | | M1 | | | | | | | Color M1 row | 27 |
| | | | | | | | M2 | | | | | | | Color M2 row | 28 |
| | | | | | | | | M1 | | | | | | Color M1 row | 29 |
| | | | | | | | | M2 | | | | | | Color M2 row | 30 |
| | | | | | | | M1 | | | | | | | Color M1 row | 31 |
| | | | | | | | M2 | | | | | | | Color M2 row | 32 |
| | | | | | | | | M1 | | | | | | Color M1 row | 33 |
| | | | | | | | | M2 | | | | | | Color M2 row | 34 |
| D1 | | | | | | | | | | M1 | | | | Color M1 row | 35 |
| | | | | | | | | | M2 | | | | | Color M2 row | 36 |
| | | | | | | | | | | M1 | | | | Color M1 row | 37 |
| | | | | | | | | | | M2 | | | | Color M2 row | 38 |
| | | | | | | | | | | | M1 | | | Color M1 row | 39 |
| | | | | | | | | | | | M2 | | | Color M2 row | 40 |
| | | | | | | | | | | | | M1 | | Color M1 row | 41 |
| | | | | | | | | | | | | M2 | | Color M2 row | 42 |

Continued from Fig. 3A

| Print # | 1 | 2 | 3 | 4 | 5 | 6 | 7 | 8 | 9 | 10 | 11 | 12 |
|---|---|---|---|---|---|---|---|---|---|---|---|---|
| | | | | | | | | | | M1 | | M2 |
| | | | | | | | | | | | M1 | |
| | | | | | | | | | | M2 | | |
| | | | | | | | | | | | | M1 |
| | | | | | | | | | | | M2 | |
| | | | | | | | | | | | | M2 |

Continued from Fig. 3B

| Pattern | Subpixel Row |
|---|---|
| Color M1 row | 43 |
| Color M2 row | 44 |
| Color M1 row | 45 |
| Color M2 row | 46 |
| Color M1 row | 47 |
| Color M2 row | 48 |
| | 49 |
| Color M2 row | 50 |

FIG. 3C

| Final Pattern | Subpixel Row |
|---|---|
| Red Row | 1 |
|  | 2 |
|  | 3 |
| Red Row | 4 |
| Blue Row | 5 |
|  | 6 |
| Red Row | 7 |
| Blue Row | 8 |
| Green Row | 9 |
| Red Row | 10 |
| Blue Row | 11 |
| Green Row | 12 |
| Red Row | 13 |
| Blue Row | 14 |
| Green Row | 15 |
| Red Row | 16 |
| Blue Row | 17 |
| Green Row | 18 |
| Red Row | 19 |
| Blue Row | 20 |
| Green Row | 21 |
| Red Row | 22 |

| Print # | 1 | 2 | 3 | 4 | 5 | 6 | 7 | 8 |
|---|---|---|---|---|---|---|---|---|
| A1 | R |   |   |   |   |   |   |   |
| A2 |   | R |   |   |   |   |   |   |
|    |   |   | R |   |   |   |   |   |
|    |   |   |   | R |   |   |   |   |
|    | B |   |   |   |   |   |   |   |
|    |   | B |   |   |   |   |   |   |
|    |   |   | B |   |   |   |   |   |
|    |   |   |   | B |   |   |   |   |
|    | G |   |   |   |   |   |   |   |
|    |   | G |   |   |   |   |   |   |
|    |   |   | G |   |   |   |   |   |
|    |   |   |   | G |   |   |   |   |
|    | R |   |   |   |   |   |   |   |
|    |   | R |   |   |   |   |   |   |
|    |   |   | R |   |   |   |   |   |
|    |   |   |   | R |   |   |   |   |
|    | B |   |   |   |   |   |   |   |
|    |   | B |   |   |   |   |   |   |
|    |   |   | B |   |   |   |   |   |
|    | G |   |   |   |   |   |   |   |
|    |   | G |   |   |   |   |   |   |
|    |   |   | G |   |   |   |   |   |

Printer: Red, Blue, Green, Red, Blue, Green

| Final Pattern | Subpixel Row |
|---|---|
| Blue Row | 23 |
| Green Row | 24 |
| Red Row | 25 |
| Blue Row | 26 |
| Green Row | 27 |
| Red Row | 28 |
| Blue Row | 29 |
| Green Row | 30 |
| Red Row | 31 |
| Blue Row | 32 |
| Green Row | 33 |
| Red Row | 34 |
| Blue Row | 35 |
| Green Row | 36 |
| Red Row | 37 |
| Blue Row | 38 |
| Green Row | 39 |
| Red Row | 40 |
| Blue Row | 41 |
| Green Row | 42 |

Continued from Fig. 4A

| Printer | Print # | 1 | 2 | 3 | 4 | 5 | 6 | 7 | 8 |
|---|---|---|---|---|---|---|---|---|---|
| Red | | R | G | B | | | | | |
| Blue | | | R | G | B | | | | |
| Green | | | B | R | G | | | | |
| | | | | B | R | G | | | |
| | | | | G | B | R | | | |
| | | | | | G | B | R | | |
| | B1 | | | | | B | R | | |
| | | | | | | | G | | |

| Final Pattern | Subpixel Row |
|---|---|
| Red Row | 43 |
| Blue Row | 44 |
| Green Row | 45 |
| Red Row | 46 |
| Blue Row | 47 |
| Green Row | 48 |
| Red Row | 49 |
| Blue Row | 50 |
| Green Row | 51 |
| Red Row | 52 |
| Blue Row | 53 |
| Green Row | 54 |
| Red Row | 55 |
| Blue Row | 56 |
| Green Row | 57 |
| Red Row | 58 |
| Blue Row | 59 |
| Green Row | 60 |
| Red Row | 61 |
| Blue Row | 62 |

Continued from Fig. 4B

| Print # | 1 | 2 | 3 | 4 | 5 | 6 | 7 | 8 |
|---|---|---|---|---|---|---|---|---|
|  |  |  |  |  |  |  | R |  |
|  |  |  |  |  |  | B |  |  |
|  |  |  |  |  | G |  |  |  |
|  |  |  |  |  |  |  |  | R |
|  |  |  |  |  |  |  | B |  |
|  |  |  |  |  |  | G |  |  |
|  |  |  |  |  | R |  |  |  |
|  |  |  |  |  |  |  |  | B |
|  |  |  |  |  |  |  | G |  |
|  |  |  |  |  |  | R |  |  |
|  |  |  |  |  | B |  |  |  |
|  |  |  |  |  |  |  |  | G |
|  |  |  |  |  |  |  | R |  |
|  |  |  |  |  |  | B |  |  |
|  |  |  |  |  | G |  |  |  |
|  |  |  |  |  |  |  |  | R |
|  |  |  |  |  |  |  | B |  |
|  |  |  |  |  |  | G |  |  |
|  |  |  |  |  | R |  |  |  |
|  |  |  |  |  |  |  |  | B |

| Final Pattern | Subpixel Row |
|---|---|
| Green Row | 63 |
| Red Row | 64 |
| Blue Row | 65 |
| Green Row | 66 |
| Red Row | 67 |
| Blue Row | 68 |
| Green Row | 69 |
| Red Row | 70 |
| Blue Row | 71 |
| Green Row | 72 |
|  | 73 |
| Blue Row | 74 |
| Green Row | 75 |
|  | 76 |
|  | 77 |
| Green Row | 78 |

Continued from Fig. 4C

| Print # | 1 | 2 | 3 | 4 | 5 | 6 | 7 | 8 |
|---|---|---|---|---|---|---|---|---|
|  |  |  |  |  |   | R | G |   |
|  |  |  |  |  | B |   |   | G |
|  |  |  |  |  |   | B | R |   |
|  |  |  |  | G |   |   |   | R |
|  |  |  |  |  |   | G | B |   |
|  |  |  |  |  |   |   | G | B |
|  |  |  |  |  |   |   |   |   |
|  |  |  |  |  |   |   |   | G |

| Final Pattern | Subpixel Row |
|---|---|
| Red Row | 43 |
| Blue Row | 44 |
| Green Row | 45 |
| Red Row | 46 |
| Blue Row | 47 |
| Green Row | 48 |
| Red Row | 49 |
| Blue Row | 50 |
| Green Row | 51 |
| Red Row | 52 |
| Blue Row | 53 |
| Green Row | 54 |
| Red Row | 55 |
| Blue Row | 56 |
| Green Row | 57 |
| Red Row | 58 |
| Blue Row | 59 |
| Green Row | 60 |
| Red Row | 61 |
| Blue Row | 62 |

Continued from Fig. 5B

Continued on Fig. 5D

| Print # | 1 | 2 | 3 | 4 | 5 | 6 | 7 | 8 | 9 | 10 |
|---|---|---|---|---|---|---|---|---|---|---|
| | | | | | | | | | | R |
| | | | | | | | | | G | |
| | | | | | | | | B | | |
| | | | | | | | R | | | |
| | | | | | | B | | | | G |
| | | | | | R | | | | G | |
| | | | | | | | | R | | |
| | | | | | G | | | | | B |
| | | | | B | | | G | | | |
| | | | | | | | | | | R |
| | | | | | | B | | | G | |
| | | | | | | | | R | | |

FIG. 5C

| Final Pattern | Subpixel Row |
|---|---|
| Green Row | 63 |
| | 64 |
| Blue Row | 65 |
| | 66 |
| | 67 |
| Blue Row | 68 |

| Print # | 1 | 2 | 3 | 4 | 5 | 6 | 7 | 8 | 9 | 10 |
|---|---|---|---|---|---|---|---|---|---|---|
| | | | | | | | | | | G |
| | | | | | | | | | B | |
| | | | | | | | | | | |
| | | | | | | | | | | |
| | | | | | | | | | | |
| | | | | | | | | | | B |

Continued from Fig. 5C

| Printer |
|---|
| Red |
| Green |
| Blue |
| White |
| Red |

| Print # | 1 | 2 | 3 | 4 | 5 | 6 | 7 | 8 | 9 | 10 |
|---|---|---|---|---|---|---|---|---|---|---|
| A1 | R | | | | | | | | | |
| | | | | | | | | | | |
| A2 | G | | | | | | | | | |
| | | | R | | | | | | | |
| | B | | | | | | | | | |
| | | | G | | | | | | | |
| | | | | R | | | | | | |
| | W | | | | | | | | | |
| | | | B | | | | | | | |
| | | | | G | | | | | | |
| | R | | | | | | | | | |
| | | | W | | | | | | | |
| | | | | R | | | | | | |
| | | | | | G | | | | | |

| Final Pattern | Subpixel Row |
|---|---|
| Red Row | 1 |
| | 2 |
| | 3 |
| | 4 |
| Red Row | 5 |
| Green Row | 6 |
| | 7 |
| | 8 |
| Red Row | 9 |
| Green Row | 10 |
| Blue Row | 11 |
| | 12 |
| Red Row | 13 |
| Green Row | 14 |
| Blue Row | 15 |
| White Row | 16 |
| Red Row | 17 |
| Green Row | 18 |
| Blue Row | 19 |
| White Row | 20 |
| Red Row | 21 |
| Green Row | 22 |

Continued from Fig. 6A / Continued on Fig. 6C

| Final Pattern | Subpixel Row |
|---|---|
| Blue Row | 23 |
| White Row | 24 |
| Red Row | 25 |
| Green Row | 26 |
| Blue Row | 27 |
| White Row | 28 |
| Red Row | 29 |
| Green Row | 30 |
| Blue Row | 31 |
| White Row | 32 |
| Red Row | 33 |
| Green Row | 34 |
| Blue Row | 35 |
| White Row | 36 |
| Red Row | 37 |
| Green Row | 38 |
| Blue Row | 39 |
| White Row | 40 |
| Red Row | 41 |
| Green Row | 42 |

Print #

| Printer | 1 | 2 | 3 | 4 | 5 | 6 | 7 | 8 | 9 | 10 |
|---|---|---|---|---|---|---|---|---|---|---|
| Green | G | R | W | B | | | | | | |
| | | G | R | W | B | | | | | |
| | | | G | R | W | B | | | | |
| Blue | | | | G | R | W | B | | | |
| | | | | | G | R | W | B | | |
| | | | | | | G | R | W | B | |
| White | W | B | | | | R | G | | | |
| | | W | B | | R | G | | | | |
| | | | W | B | R | G | | | | |

Continued from Fig. 6B / Continued on Fig. 6D

| Print # | 1 | 2 | 3 | 4 | 5 | 6 | 7 | 8 | 9 | 10 | | Final Pattern | Subpixel Row |
|---|---|---|---|---|---|---|---|---|---|---|---|---|---|
|  |  |  | W |   |   |   |   |   |   |   |  | Blue Row   | 43 |
|  |  |  |   | B |   |   |   |   |   |   |  | White Row  | 44 |
|  |  |  |   | W |   |   |   |   |   |   |  | Red Row    | 45 |
|  |  |  |   |   | B |   |   |   |   |   |  | Green Row  | 46 |
|  |  |  |   |   | W |   |   |   |   |   |  | Blue Row   | 47 |
|  |  |  |   |   |   | G |   |   |   |   |  | White Row  | 48 |
|  |  |  |   |   |   | B |   |   |   |   |  | Red Row    | 49 |
|  |  |  |   |   |   | W |   |   |   |   |  | Green Row  | 50 |
|  |  |  |   |   |   |   | R |   |   |   |  | Blue Row   | 51 |
|  |  |  |   |   |   |   | G |   |   |   |  | White Row  | 52 |
|  |  |  |   |   |   |   | B |   |   |   |  | Red Row    | 53 |
|  |  |  |   |   |   |   | W |   |   |   |  | Green Row  | 54 |
|  |  |  |   |   |   |   |   | R |   |   |  | Blue Row   | 55 |
|  |  |  |   |   |   |   |   | G |   |   |  | White Row  | 56 |
|  |  |  |   |   |   |   |   | B |   |   |  | Red Row    | 57 |
|  |  |  |   |   |   |   |   | W |   |   |  | Green Row  | 58 |
|  |  |  |   |   |   |   |   |   | R |   |  | Blue Row   | 59 |
|  |  |  |   |   |   |   |   |   | G |   |  | White Row  | 60 |
|  |  |  |   |   |   |   |   |   |   | R |  | Red Row    | 61 |
|  |  |  |   |   |   |   |   |   |   | G |  | Green Row  | 62 |

| Final Pattern | Subpixel Row |
|---|---|
| Blue Row | 63 |
| White Row | 64 |
| Red Row | 65 |
| Green Row | 66 |
| Blue Row | 67 |
| White Row | 68 |
| Red Row | 69 |
| Green Row | 70 |
| Blue Row | 71 |
| White Row | 72 |
| Red Row | 73 |
| Green Row | 74 |
| Blue Row | 75 |
| White Row | 76 |
| Red Row | 77 |
| Green Row | 78 |
| Blue Row | 79 |
| White Row | 80 |
| Green Row | 82 |

| Print # | 1 | 2 | 3 | 4 | 5 | 6 | 7 | 8 | 9 | 10 |
|---|---|---|---|---|---|---|---|---|---|---|
| | | | | | | | R | W | B | |
| | | | | | | G | | | W | B |
| | | | | | B | | R | | | W |
| | | | | | | W | | G | R | |
| | | | | | | B | | | G | R |
| | | | | | W | | B | | | G |
| | | | | | | R | | W | B | |
| | | | | | G | | R | | | B |
| | | | | | | | W | B | | |
| | | | | | | | | | | G |

Continued from Fig. 6D

| Print # | 1 | 2 | 3 | 4 | 5 | 6 | 7 | 8 | 9 | 10 |
|---|---|---|---|---|---|---|---|---|---|---|
|  |  |  |  |  |  |  |  |  | B |  |
|  |  |  |  |  |  |  |  | W |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  | B |  |
|  |  |  |  |  |  |  |  |  | W |  |
|  |  |  |  |  |  |  |  |  |  | W |

| Final Pattern | Subpixel Row |
|---|---|
| Blue Row | 83 |
| White Row | 84 |
|  | 85 |
|  | 86 |
| Blue Row | 87 |
| White Row | 88 |
|  | 89 |
|  | 90 |
|  | 91 |
| White Row | 92 |

| Printer | Print # | 1 | 2 | 3 | 4 | 5 | 6 | | Final Pattern | Subpixel Row |
|---|---|---|---|---|---|---|---|---|---|---|
| Red | A1 | R | | | | | | | Red Row | 1 |
| Green | | G | | | | | | | Green Row | 2 |
| open | | | R | | | | | | Red Row | 3 |
| Red | A2 | R | | | | | | | | 4 |
| Green | | G | | | | | | | Green Row | 5 |
| open | | | R | | | | | | Red Row | 6 |
| Red | | R | | | | | | | | 7 |
| Green | | G | | | | | | | Green Row | 8 |
| open | | | R | | | | | | Red Row | 9 |
| Red | | R | | | | | | | | 10 |
| Green | | G | | | | | | | Green Row | 11 |
| | | | R | | | | | | Red Row | 12 |
| | | | | | | | | | | 13 |
| | | | | | | | | | Green Row | 14 |
| | | | | | | | | | Red Row | 15 |
| | | | | | | | | | | 16 |
| | | | | | | | | | Green Row | 17 |
| | | | | | | | | | Red Row | 18 |
| | | | | | | | | | | 19 |
| | | | | | | | | | Green Row | 20 |
| | | | | | | | | | Red Row | 21 |
| | | | | | | | | | | 22 |

| Final Pattern | Subpixel Row |
|---|---|
| | 23 |
| Green Row | 24 |
| Red Row | 25 |
| | 26 |
| Green Row | 27 |
| Red Row | 28 |
| | 29 |
| Green Row | 30 |
| Red Row | 31 |
| | 32 |
| Green Row | 33 |
| Red Row | 34 |
| | 35 |
| Green Row | 36 |
| Red Row | 37 |
| | 38 |
| Green Row | 39 |
| Red Row | 40 |
| | 41 |
| Green Row | 42 |

Continued from Fig. 7A

Continued from Fig. 7C

| Print # | 1 | 2 | 3 | 4 | 5 | 6 | 7 | 8 |
|---|---|---|---|---|---|---|---|---|
|  |  |  |  |  |  |  | G |  |
|  |  |  |  |  |  |  |  | R |
|  |  |  |  |  |  |  |  | G |
|  |  |  |  |  |  |  | R |  |
|  |  |  |  |  |  |  | G |  |
|  |  |  |  |  |  |  |  | R |
|  |  |  |  |  |  |  |  | G |

| Final Pattern | Subpixel Row |
|---|---|
| Green Row | 63 |
| Red Row | 64 |
| Green Row | 65 |
| Green Row | 66 |
| Red Row | 67 |
| Green Row | 68 |
| Green Row | 69 |
| Red Row | 70 |
| Green Row | 71 |
| Green Row | 72 |

FIG. 7D

MULTICOLOR ELECTRONIC DEVICES AND PROCESSES OF FORMING THE SAME BY PRINTING

RELATED APPLICATION

This application claims priority under 35 U.S.C. §119(e) from Provisional Application No. 61/012,601 filed on Dec. 10, 2007 which is incorporated by reference in its entirety.

FIELD OF THE DISCLOSURE

This disclosure relates in general to electronic devices and processes, and more particularly, to electronic devices having electrodes and organic active regions of different colors, and processes of forming the same.

DESCRIPTION OF THE RELATED ART

An electronic device can include a liquid crystal display ("LCD"), an organic light-emitting diode (OLED) display, or the like. The manufacture of electronic devices may be performed using solution deposition techniques. One process of making electronic devices is to deposit organic layers over a substrate by printing (e.g., ink-jet printing, continuous printing, etc.). In a printing process, the liquid composition being printed includes an organic material in a solution, dispersion, emulsion, or suspension with an organic solvent, with an aqueous solvent, or with a combination of solvents. After printing, the solvent(s) is(are) evaporated and the organic material remains to form an organic layer for the electronic device.

Typically, a first color is printed and then the printing device is recalibrated and a second color is printed. In some cases, the substrate with the first printed color is moved to a second printer for printing the second color. This also requires time for setting up the printer and alignment. In many cases, three colors are printed: red, green, and blue. In this case, time must be taken to recalibrate and/or realign with each color. There is a need for improved printing processes.

SUMMARY

There is provided a method of printing a regular array of rows of subpixels on a workpiece, the subpixels having c different colors and having a subpixel pitch s, said method comprising:

(a) providing a printing head having z nozzles arranged in a row with a spacing p, where $z=n_1(c)$ and $p=n_2(s)$, the printhead being at a first position relative to the workpiece;

(b) providing c different printing inks, one for each of the c colors;

(c) supplying each of the printing inks to the nozzles in a regular alternating pattern;

(d) printing a first set of z rows of subpixels with the printing head;

(e) moving the workpiece laterally relative to the printing head by a distance $d_1$, where $d_1=n_3(s)$;

(f) printing a second set of z rows of subpixels with the printing head;

(g) repeating steps (e) and (f) for a total of $n_2$ sets of z rows of subpixels;

where:

c is an integer greater than 1;

$n_1$, $n_2$, and $n_3$ are the same or different and are independently selected from integers greater than 0, with the proviso that $n_2$ is not a multiple of c.

There is also provided the above method, further comprising moving the workpiece laterally relative to the printing head by a distance of $d_2$ relative to the first printing position, where $d_2=n_2zs$, and repeating steps (d) through (g).

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

FIG. 3 includes a diagram illustrating a printing method with two colors.

FIG. 4 includes a diagram illustrating a printing method with three colors.

FIG. 6 includes a diagram illustrating a printing method with four colors.

FIG. 7 includes another diagram illustrating a printing method for two colors.

Figure 1:
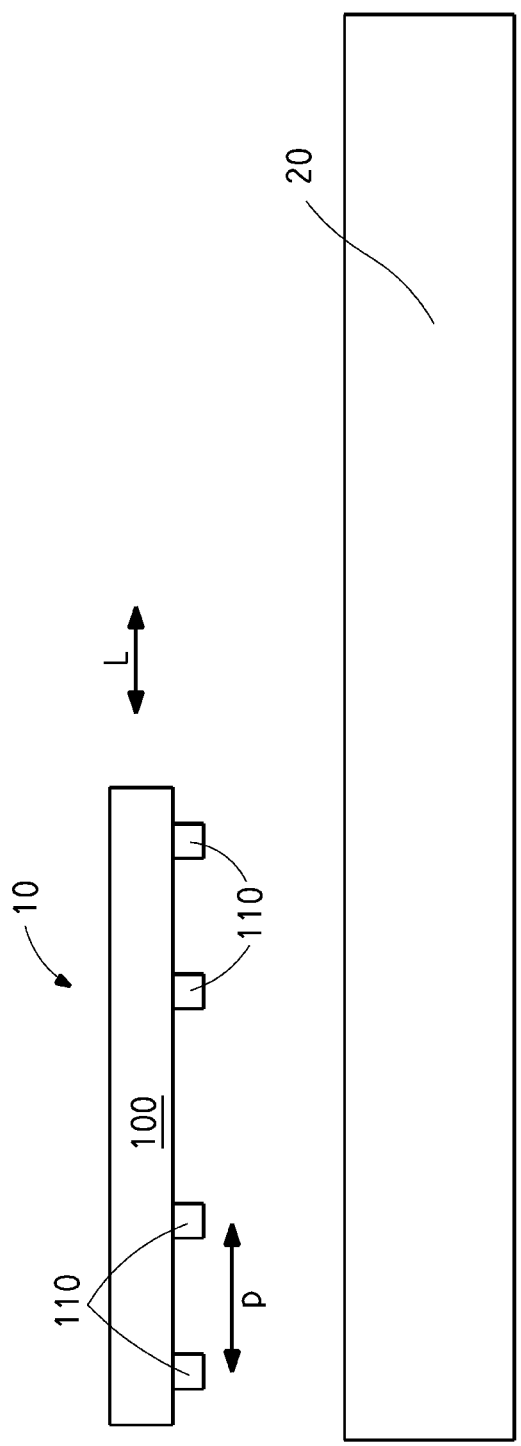
FIG. 1 includes a plan view of a workpiece for making an electronic device including a display.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Many aspects and embodiments have been described above and are merely exemplary and not limiting. After reading this specification, skilled artisans appreciate that other aspects and embodiments are possible without departing from the scope of the invention.

Other features and benefits of any one or more of the embodiments will be apparent from the following detailed description, and from the claims. The detailed description first addresses Definitions and Clarification of Terms followed by the Printer, the Method of Printing, and the Electronic Device.

1. DEFINITIONS AND CLARIFICATION OF TERMS

Before addressing details of embodiments described below, some terms are defined or clarified.

The term "array" is intended to mean an ordered arrangement of elements. An array may include pixels, subpixels, cells, or other structures within an ordered arrangement, usually designated by columns and rows. The array can be described in terms of an x-direction and a y-direction.

The term "blue light-emitting component" is intended to mean an electronic component capable of emitting radiation having an emission maximum at a wavelength in a range of approximately 400 to 500 nm.

The term "continuous" and its variants are intended to mean substantially unbroken. In one embodiment, continuously printing is printing using a substantially unbroken stream of a liquid or a liquid composition, as opposed to a depositing technique using drops. In another embodiment, extending continuously refers to a length of a layer, member, or structure in which no significant breaks in the layer, member, or structure lie along its length.

The term "electronic device" is intended to mean a collection of circuits, electronic components, or any combination thereof that collectively, when properly electrically connected and supplied with the appropriate potential(s), performs a function. An electronic device may be included or be part of a system. An example of an electronic device includes a display, a sensor array, a computer system, an avionics system, an automobile, a cellular phone, other consumer or industrial electronic product, or any combination thereof.

The term "green light-emitting component" is intended to mean an electronic component capable of emitting radiation having an emission maximum at a wavelength in a range of approximately 500 to 600 nm.

The term "guest material" is intended to mean a material, within a layer including a host material, that changes the electronic characteristic(s) or the targeted wavelength of radiation emission, reception, or filtering of the layer compared to the electronic characteristic(s) or the wavelength of radiation emission, reception, or filtering of the layer in the absence of such material.

The term "host material" is intended to mean a material, usually in the form of a layer, to which a guest material may or may not be added. The host material may or may not have electronic characteristic(s) or the ability to emit, receive, or filter radiation.

The term "liquid composition" is intended to mean a material that is dissolved in a liquid medium to form a solution, dispersed in a liquid medium to form a dispersion, or suspended in a liquid medium to form a suspension or an emulsion.

The term "liquid medium" is intended to mean a liquid within a solution, dispersion, suspension, or emulsion. The term "liquid medium" is used regardless whether one or more solvents are present, and therefore, liquid medium is used as the singular or plural form (i.e., liquid media) of the term.

The term "nozzle" is intended to mean a portion of an apparatus through which a liquid composition or liquid medium can be dispensed.

The term "oriented" is intended to mean a principal direction in which a feature extends. As between different features at the same elevation or at different elevations, the features may be oriented substantially parallel, substantially perpendicular, or in another angular relationship with respect to each other.

The term "organic active layer" is intended to mean one or more organic layers, wherein at least one of the organic layers, by itself, or when in contact with a dissimilar material is capable of forming a rectifying junction. The term "organic active region" is intended to mean one or more organic region, wherein at least one of the organic regions, by itself, or when in contact with a dissimilar material is capable of forming a rectifying junction.

The term "organic layer" is intended to mean one or more layers, wherein at least one of the layers comprises a material including carbon and at least one other element, such as hydrogen, oxygen, nitrogen, fluorine, etc.

The term "pitch" is intended to mean a sum of a feature dimension and a space dimension between immediately adjacent features.

The term "pixel" is intended to mean the smallest complete, repeating unit of an array. The term "subpixel" is intended to mean a portion of a pixel that makes up only a part, but not all, of a pixel. In a full-color display, a full-color pixel can comprise three sub-pixels with primary colors in red, green and blue spectral regions. A sensor array can include pixels that may or may not include subpixels.

The term "printing" is intended to mean an act of selectively depositing a layer by using a printing head or other similar structure to dispense a liquid or liquid composition onto a workpiece.

The term "printing apparatus" is intended to mean a combination of one or more materials, equipment, assembly or subassembly designed for printing a layer onto a workpiece.

The term "radiation-emitting component" is intended to mean an electronic component, which when properly biased, emits radiation at a targeted wavelength or spectrum of wavelengths. The radiation may be within the visible-light spectrum or outside the visible-light spectrum (UV or IR). A light-emitting component, such as a light-emitting diode, is an example of a radiation-emitting component.

The term "radiation-responsive component" is intended to mean an electronic component, which when properly biased, can respond to radiation at a targeted wavelength or spectrum of wavelengths. The radiation may be within the visible-light spectrum or outside the visible-light spectrum (UV or IR). An IR sensor and a photovoltaic cell are examples of radiation-sensing components.

The term "rectifying junction" is intended to mean a junction within a semiconductor layer or within a semiconductor region or a junction formed by an interface between a semiconductor layer or a semiconductor region and a dissimilar material, in which charge carriers of one type flow more easily in one direction through the junction compared to the opposite direction. A pn junction is an example of a rectifying junction that can be used as a diode.

The term "red light-emitting component" is intended to mean an electronic component capable of emitting radiation having an emission maximum at a wavelength in a range of approximately 600 to 700 nm.

The term "resolution limit" is intended to mean the smallest feature size that can be reproducibly formed when using a particular apparatus or other equipment.

The term "visible light spectrum" is intended to mean a radiation spectrum having wavelengths corresponding to approximately 400 to 700 nm.

The term "width" is intended to mean a dimension, as seen from a top view and regardless of layer, which is measured in a direction that corresponds to a narrower dimension of a particular feature. The term "length" is intended to mean a dimension, as seen from a top view and regardless of layer, which is measured in a direction substantially perpendicular to the width.

The term "workpiece" is intended to mean a substrate with one or more device layers thereon. A device layer can be inorganic or organic.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics*, 81$^{st}$ Edition (2000-2001).

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

2. PRINTER

Before addressing particular embodiments, the printer is addressed to aid in understanding the concepts as described herein.

As shown in FIG. 1, printer 10 has a printing head 100 with nozzles 110 attached. The spacing between the nozzles is shown as p. The printer is attached to lines (not shown) to supply the appropriate liquid composition to each nozzle. The different liquid compositions, one for each color, are supplied in a regular alternating pattern. By this is meant that one of each color is supplied before any are duplicated, and that additional colors are supplied in the same order. In this figure, the first nozzle can have color 1, the second nozzle color 2, the third nozzle color 1, and the fourth nozzle color 2. For a system having 3 colors, R, G, and B, and $3n_1$ nozzles (not shown) the liquid compositions can be supplied so that the first nozzle has R, the second nozzle has G, the third nozzle has B, the fourth nozzle has R, the fifth nozzle has G, the sixth nozzle has B, and so forth.

The printing head is shown over workpiece 20. The printing head and workpiece can be moved with respect to each other, as shown by L. This movement is relative. In some cases, the workpiece is moved. In some cases, the printing head is moved. In some cases, both the printing head and the workpiece are moved. For simplicity, the movement will be addressed as if only the printing head moved, and as if the workpiece were stationary. It will be understood that either or both of the printing head and workpiece can be moved and it is only their movement relative to each other that is at issue.

In the embodiment shown in FIG. 1, the printer has 4 nozzles. The actual number of nozzles can be greater than this and is limited only by practical manufacturing considerations. In some embodiments, the number of nozzles ranges from 6 to 24.

The printing delivery can be by any known system for depositing liquid materials. Some examples of printing techniques include, but are not limited to ink jet and continuous nozzle spray.

3. METHOD OF PRINTING

Figure 2:
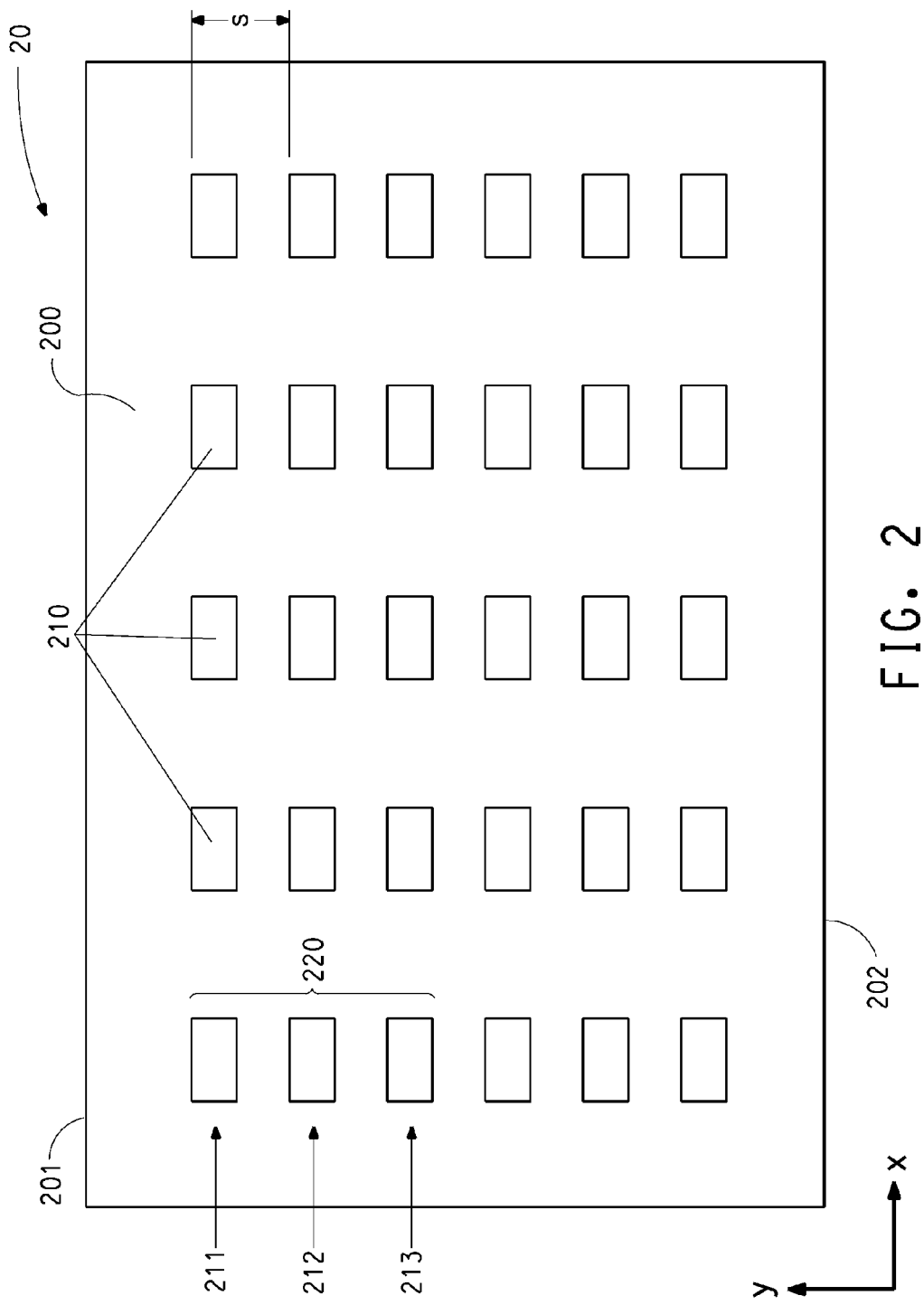
FIG. 2 includes an illustration of a cross-sectional view of the workpiece and a printer.

FIG. 2 includes a plan view of workpiece 20 for making an electronic device. The workpiece includes a substrate 200 having a regular array of subpixel openings 210. The workpiece has a first edge 201 and an opposite edge 202. Only a few subpixels are illustrated in the figure. In practice, devices may have hundreds of subpixels or more. In some embodiments, the subpixel openings are defined by a containment structure (not shown) which can be a physical containment structure, a chemical containment structure, or both. The subpixel openings 210 are in a regular array of rows, shown as 211, 212, and 213. The subpixel pitch is shown as s. In this illustration, three subpixels together form pixel 220. In the illustrated embodiment, the subpixels 210 have a rectangular shape. Other subpixel shapes can be used, such as circular, oval, square, or polygonal. The printing direction is shown as x in the figure. Lateral movement is defined as movement in the y direction, perpendicular to the printing direction.

In the method described herein, a regular array of rows of subpixels in printed onto a workpiece. The number of colors printed is c, where c is at least 2, and the subpixels have a subpixel pitch s. The method comprises:
(a) providing a printing head having z nozzles arranged in a row with a spacing p, where $z=n_1(c)$ and $p=n_2(s)$, the printhead being at a first position relative to the workpiece;
(b) providing c different printing inks, one for each of the c colors;
(c) supplying each of the printing inks to the nozzles in a regular alternating pattern;
(d) printing a first set of z rows of subpixels with the printing head;
(e) moving the workpiece laterally relative to the printing head by a distance $d_1$, where $d_1=n_3(s)$;
(f) printing a second set of z rows of subpixels with the printing head;
(g) repeating steps (e) and (f) for a total of $n_2$ sets of z rows of subpixels;
where:
c is an integer greater than 1;
$n_1$, $n_2$, and $n_3$ are the same or different and are independently selected from integers greater than 0, with the proviso that $n_2$ is not a multiple of c.

The printing head has z nozzles, where z is a multiple of the number of colors, c. Thus, $z=n_1(c)$, where $n_1$ is an integer greater than 0. In some embodiments, c is 2, 3, or 4. In some embodiments, when c=3, the colors are red, blue and green. In some embodiments, when c=4, the colors are red, blue, green and white. In some embodiments, $n_1$ is 2 or greater. In some embodiments, c=2 and $n_1$=4-8. In some embodiments, c=3 and $n_1$=3-5. In some embodiments, c=4 and $n_1$=2-4.

The printing head starts at a first printing position over the workpiece. This first position is referred to as A1, which will be discussed in a later section. In some embodiments, the printer is positioned at one edge of the workpiece, shown as 201 in FIG. 2, and aligned to be over the first row of subpixels. The nozzles are spaced apart by a distance p so that they are all aligned to print in the subpixel rows. Thus, they are spaced apart by multiples of the subpixel pitch, s. Thus, $p=n_2(s)$, where $n_2$ is an integer greater than 0, but not a multiple of c. The term "multiple of a number" means a value which is the number times an integer greater than 0. In some embodiments, $n_2$ is greater than or equal to c+1. In some embodiments, $n_2$=c+1.

The printer prints across the workpiece in the x-direction to print a first set of rows of subpixels. The number of rows printed is equal to the number of nozzles on the printing head.

After completion of the printing of the first set of rows, the printing head moves laterally across the workpiece to an adjacent printing position. This position is referred to as A2, which will be discussed in a later section. This movement is parallel to the plane of the workpiece and in the y-direction, which is perpendicular to the row direction. The distance moved, $d_1$, is also a multiple of the subpixel pitch, s. Thus, $d_1=n_3(s)$, where $n_3$ is an integer greater than 0. In some embodiments, $n_3$ is a multiple of the number of colors. In these embodiments, $n_3=n_4 c$, where $n_4$ is an integer greater than 0. A second set of z rows is then printed. The printing can be in the opposite direction from the first printing or the printing head can return to the same side as for the first printing and print in the same direction. This is determined by the equipment and the software.

The above steps are repeated until a first group totaling $n_2$ sets of subpixel rows have been printed.

In some embodiments, after $n_2$ sets of subpixel rows have been printed, the printing head is moved by a distance of $d_2$ relative to the first printing position, A1, to a second printing position. The second printing position is referred to as B1, which is discussed in a later section. The distance moved, $d_2$, is a function of the number of nozzles and the spacing between them: $d_2=n_2 zs$. This is done to print more subpixel rows without overprinting any of the subpixels. After the movement by $d_2$, steps (d) through (g) are repeated, and a second group of $n_2$ sets of subpixel rows are printed.

After the second group of $n_2$ sets of subpixel rows have been printed, the printing head is moved by a distance of $d_2$ relative to printing position B1, to a third printing position. The third printing position is referred to as C1, which will be discussed in a later section. A third set of $n_2$ subpixel rows is then printed. The steps of moving by $d_2$ and printing $n_2$ subpixel rows are continued until the printer has reached the opposite edge of the workpiece, shown as 202 in FIG. 2. In this printing method, a few of the subpixel opening will not be printed at the first edge and at the opposite edge. These will be waste areas on the workpiece.

In practice, the subpixel rows can be printed in any order. The movements of the printing head relative to the workpiece will be as discussed above, and the $n_2$ sets of subpixel rows will be printed starting from position A1, B1, C1, etc., but not necessarily in order. The exact order of printing will be determined by the most efficient way to utilize the printer.

The method described herein is illustrated further in FIGS. 3-7. In FIG. 3 there are 2 colors, M1 and M2. There are 4 nozzles on the printing head, and the spacing between nozzles is 3 units of subpixel pitch. Thus, in this illustration:

c=2,
z=4,
$n_1$=2, and
$n_2$=3.

The colors are arranged as shown under the column labeled "Printer." The printing head is positioned at the first edge with the first nozzle, having color M1, over subpixel row 1. This is the first printing position shown as A1. The position A1 is defined as the subpixel row over which the first nozzle is placed. The printer prints across the workpiece in the row direction to form a row of color M1 in subpixel row 1, a row of color M2 in subpixel row 4, a row of color M1 in subpixel row 7, and a row of color M2 in subpixel row 10. This is shown in the column labeled Print #1. Only one subpixel is shown for each color for purposed of clarity, but each represents an entire row of subpixels. The printer then shifts laterally by a distance $d_1$ which is $n_3$ subpixel units. In this case $n_3$=2.This is position A2 for the printer. The printer then prints a second set of rows: a row of color M1 in subpixel row 3, a row of color M2 in subpixel row 6, a row of color M1 in subpixel row 9, and a row of color M2 in subpixel row 12, as shown in the column labeled Print #2. Print #2 is shown shifted to the right of Print #1 for purposes of clarity. Both Print #1 and Print #2, as well as all the other Print numbers, represent full rows of printed subpixels across the workpiece. The printer then again shifts laterally by 2 subpixel units. This is position A3 for the printer. The printer then prints a third set of rows: a row of color M1 in subpixel row 5, a row of color M2 in subpixel row 8, a row of color M1 in subpixel row 11, and a row of color M2 in subpixel row 14, as shown in the column labeled Print #3.

At this point, the printer has printed three sets of four rows of subpixels, which is $n_2$ sets of z subpixel rows. The printing head is then moved laterally by a distance $d_2$, where $d_2=n_2 zs$, which is equal to 12 in this illustration. The new position is the second printing position shown as B1, where B1=A1+12=13. The printer then prints a fourth set of rows: a row of color M1 in subpixel row 13, a row of color M2 in subpixel row 16, a row of color M1 in subpixel row 19, and a row of color M2 in subpixel row 22, as shown in the column labeled Print #4. The printer then shifts laterally by a distance $d_1$ which is 2 subpixel units. This is position B2 for the printer. The printer then prints a fifth set of rows: a row of color M1 in subpixel row 15, a row of color M2 in subpixel row 18, a row of color M1 in subpixel row 21, and a row of color M2 in subpixel row 24, as shown in the column labeled Print #5. The printer then again shifts laterally by 2 subpixel units. This is position B3 for the printer. The printer then prints a sixth set of rows: a row of color M1 in subpixel row 17, a row of color M2 in subpixel row 20, a row of color M1 in subpixel row 23, and a row of color M2 in subpixel row 26, as shown in the column labeled Print #6.

At this point, the printer has printed another $n_2$ sets of z subpixel rows. The printing head is then moved laterally by a distance $d_2$ which is 12. The new position is the third printing position, shown as C1, where C1=B1+12=25. Three more sets of subpixel rows are printed in the same way as shown in Print #7-9. The printing head is then moved laterally by a distance $d_2$ which is 12. The new position is the fourth printing position, shown as D1, where D1=C1+12=37. The printing of the workpiece in this illustration is completed by printing three more sets of subpixel rows as shown in Print #10-12. At this time the printing has reached the opposite edge of the workpiece. In practice, most devices will require many more rows, up to hundreds of subpixel rows and more, and these rows will be printed in an analogous manner. The 50 subpixel rows in the figure are shown only as an illustration.

The printed outcome is shown in the column labeled "Pattern". It can be seen that subpixels are missing for subpixel row 2 and subpixel row 49. Thus the usable device area is from subpixel row 3 to subpixel row 48.

In FIG. 4 there are 3 colors, red, blue, and green. There are 9 nozzles on the printing head, and the spacing between nozzles is 4 units of subpixel pitch. Thus, in this illustration:

c=3,
z=9,
$n_1$=3, and
$n_2$=4.

The colors are arranged as shown in the "Printer" column. The printing head is positioned at A1 over subpixel row 1, at the first edge of the workpiece. The printer prints across the workpiece in the row direction to form a row of red in subpixel row 1, a row of blue in subpixel row 5, a row of green in subpixel row 9, a row of red in subpixel row 13, a row of blue in subpixel row 17, a row of green in subpixel row 21, a row of red in subpixel row 25, a row of blue in subpixel row 29, and a row of green in subpixel row 33. This is shown in the column labeled Print #1. As in FIG. 3, only one subpixel is shown for each color for purposed of clarity, but each represents an entire row of subpixels. The printer then shifts laterally by a distance $d_1$ which is $n_3$ subpixel units. In this case $n_3$=3. This is position A2 for the printer. The printer then prints a second set of rows: red in subpixel rows 4, 16, and 28; blue in subpixel rows 8, 20, and 32; and green in subpixel rows 12, 24, and 36. This is shown in the Print #2 column. Print #2 is shown shifted to the right of Print #1 for purposes of clarity. Both Print #1 and Print #2, as well as all the other Print numbers, represent full rows of printed subpixels across the workpiece. The printer is then shifted 3 subpixel units for Print #3 and shifted again 3 subpixel units for Print #4.

At this point, the printer has printed four sets of nine rows of subpixels, which is $n_2$ sets of z subpixel rows. The printing head is then moved laterally by a distance $d_2$, where $d_2=n_2zs$, which is equal to 36 subpixel units in this illustration. The new position is the second printing position, B1, where $$B1=A1+36=37.$$

The printer then prints four more sets of nine rows of subpixels as shown in Print #5-8.

The printed outcome is shown in the column labeled "Pattern". It can be seen that subpixels are missing for subpixel rows 2, 3 and 6 at the first edge and subpixel rows 73, 76, and 77 at the opposite edge. Thus the usable device area is from subpixel row 7 to subpixel row 72. Although red, blue, and green are exemplified in this figure, other colors could be used.

Figure 5A:
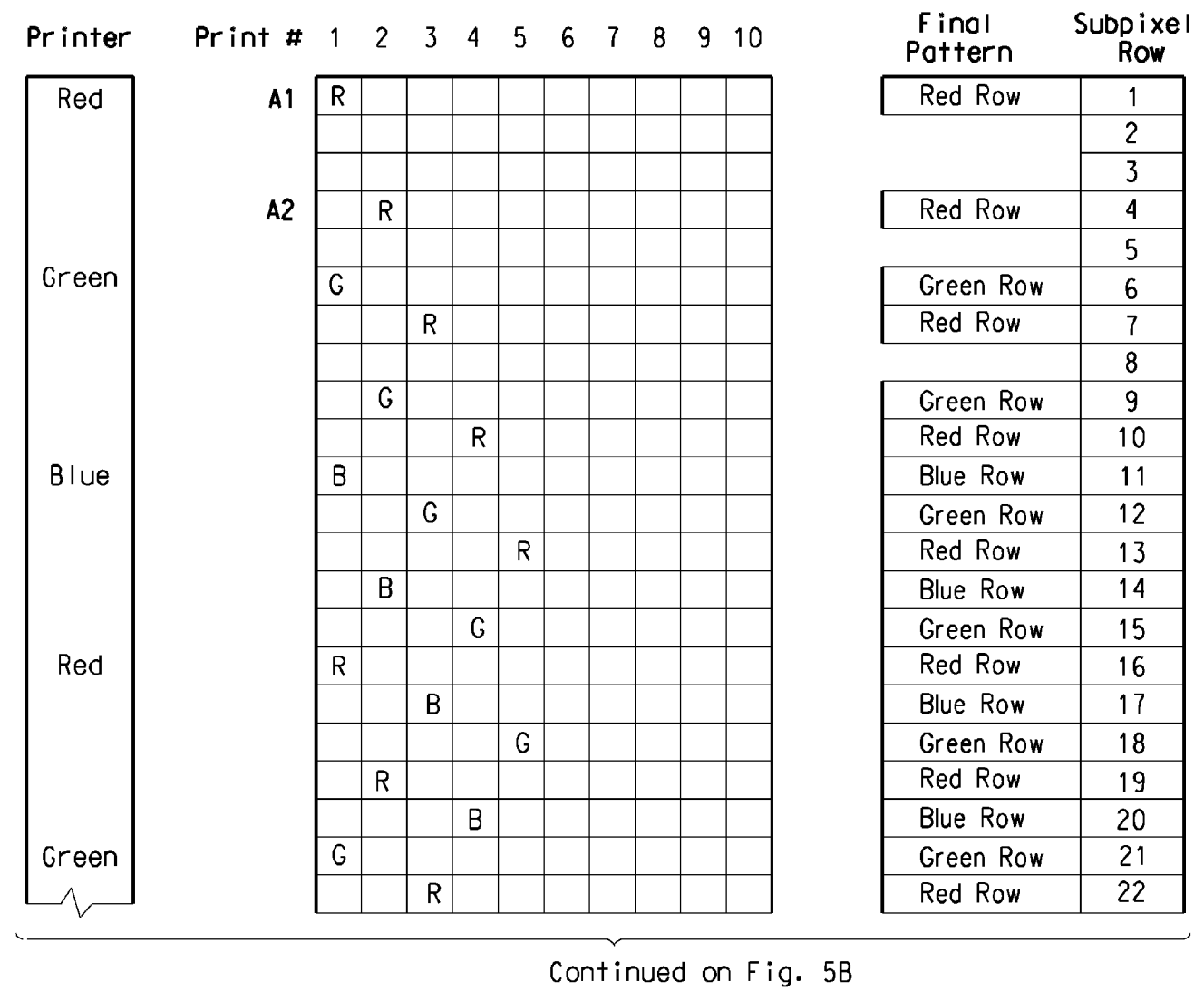
Figure 5B:
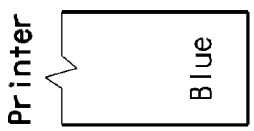
FIG. 5 includes another diagram illustrating a printing method with three colors.

In FIG. 5 there are 3 colors, red, blue, and green. There are 6 nozzles on the printing head, and the spacing between nozzles is 5 units of subpixel pitch. Thus, in this illustration:

c=3,
z=6,
$n_1$=2, and
$n_2$=5.

The colors are arranged as shown in the "Printer" column. The printing head is positioned at A1 over subpixel row 1, at the first edge of the workpiece. The printer prints across the workpiece in the row direction to form a row of red in subpixel row 1, a row of green in subpixel row 6, a row of blue in subpixel row 11, a row of red in subpixel row 16, a row of green in subpixel row 21, and a row of blue in subpixel row 26. This is shown in the column labeled Print #1. As in FIG. 3, only one subpixel is shown for each color for purposed of clarity, but each represents an entire row of subpixels. The printer then shifts laterally by a distance $d_1$ which is $n_3$ subpixel units. In this case $n_3$=3. This is position A2 for the printer. The printer then prints a second set of rows: red in subpixel rows 4 and 19; green in subpixel rows 9 and 24; and blue in subpixel rows 14 and 29. This is shown in the Print #2 column. Print #2 is shown shifted to the right of Print #1 for purposes of clarity. Both Print #1 and Print #2, as well as all the other Print numbers, represent full rows of printed subpixels across the workpiece. The printer is then shifted 3 subpixel units for Print #3, shifted again 3 subpixel units for Print #4, and shifted again 3 subpixel units for Print #5.

At this point, the printer has printed five sets of six rows of subpixels, which is $n_2$ sets of z subpixel rows. The printing head is then moved laterally by a distance $d_2$, where $d_2=n_2zs$, which is equal to 30 subpixel units in this illustration. The new position is the second printing position, B1, where:

$$B1=A1+30=31.$$

The printer then prints five more sets of six rows of subpixels as shown in Print #6-10.

The printed outcome is shown in the column labeled "Pattern". It can be seen that subpixels are missing for subpixel rows 2, 3, 5 and 8 at the first edge and subpixel rows 61, 64, 66, and 67 at the opposite edge. Thus the usable device area is from subpixel row 9 to subpixel row 60. Although red, blue, and green are exemplified in this figure, other colors could be used.

In FIG. 6 there are 4 colors, red, green, blue and white. There are 8 nozzles on the printing head, and the spacing between nozzles is 5 units of subpixel pitch. Thus, in this illustration:

c=4,
z=8,
$n_1$=2, and
$n_2$=5.

The colors are arranged as shown in the "Printer" column. The printing head is positioned at A1 over subpixel row 1, at the first edge of the workpiece. The printer prints across the workpiece in the row direction to form a row of red in subpixel row 1, a row of green in subpixel row 6, a row of blue in subpixel row 11, a row of white in subpixel row 16, a row of red in subpixel row 21, a row of green in subpixel row 26, a row of blue in subpixel row 31, and a row of white in subpixel row 36. This is shown in the column labeled Print #1. As in FIG. 3, only one subpixel is shown for each color for purposed of clarity, but each represents an entire row of subpixels. The printer then shifts laterally by a distance $d_1$ which is $n_3$ subpixel units. In this case $n_3$=4. This is position A2 for the printer. The printer then prints a second set of rows: red in subpixel rows 5 and 25; green in subpixel rows 14 and 34; blue in subpixel rows 15 and 35; and white in subpixel rows 20 and 40. This is shown in the Print #2 column. Print #2 is shown shifted to the right of Print #1 for purposes of clarity. Both Print #1 and Print #2, as well as all the other Print numbers, represent full rows of printed subpixels across the workpiece. The printer is then shifted 4 subpixel units for Print #3, shifted again 4 subpixel units for Print #4, and shifted again 4 subpixel units for Print #5.

At this point, the printer has printed five sets of eight rows of subpixels, which is $n_2$ sets of z subpixel rows. The printing head is then moved laterally by a distance $d_2$, where $d_2=n_2zs$, which is equal to 40 subpixel units in this illustration. The new position is the second printing position, B1, where:

$$B1=A1+40=41.$$

The printer then prints five more sets of eight rows of subpixels as shown in Print #6-10.

The printed outcome is shown in the column labeled "Pattern". It can be seen that subpixels are missing for subpixel rows 2-4, 7, 8 and 12 at the first edge and subpixel rows 81, 85, 86, and 89-91 at the opposite edge. Thus the usable device area is from subpixel row 13 to subpixel row 80. Although red, green, blue, and white are exemplified in this figure, other colors could be used.

Figure 7C:
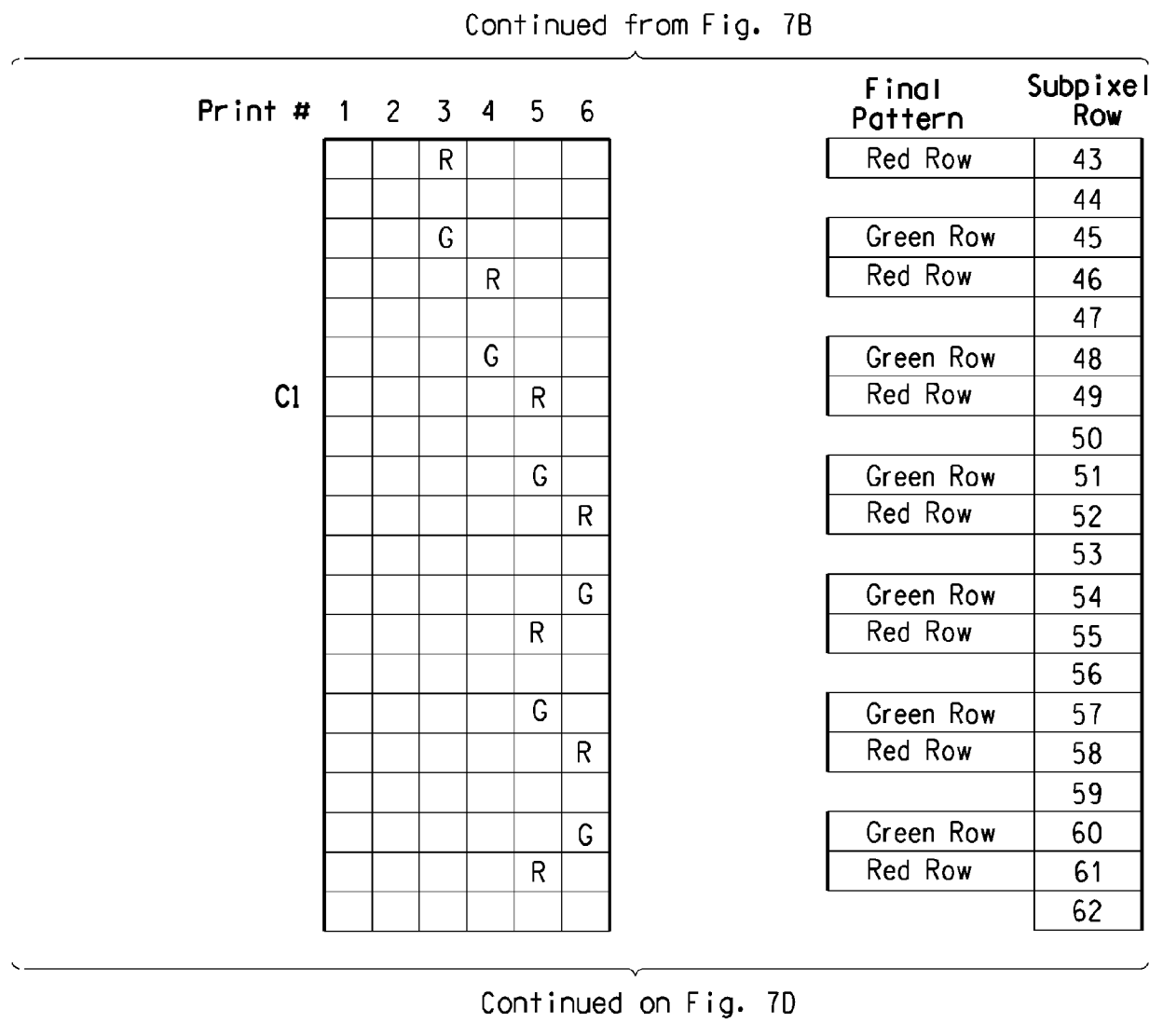

In some cases, not all the colors of a device are printed. One or more colors may be deposited using other deposition methods. Such methods include, but are not limited to, vapor deposition, thermal transfer, and continuous liquid deposition techniques such as spin coating, gravure coating, curtain coating, dip coating, slot-die coating, and spray coating. In these cases, the printing must leave open spaces for the nonprinted colors, which can be applied before or after the printing step. This is illustrated in FIG. 7.

There are 2 colors, red and green, and an open space for a third color to be deposited at a different time. For the purposes of the printing pattern, this is counted as 3 colors. There are 8 nozzles printing red and green, and 4 nozzles that are not printing. The non-printing nozzles may or may not be physically present on the printing head. This is counted as a total of 12 nozzles. The spacing between nozzles (printing nozzles and non-printing nozzles) is 2 units of subpixel pitch. Thus, in this illustration:

c=3,
z=12,
$n_1$=4, and
$n_2$=2.

The colors are arranged as shown in the "Printer" column, where "open" indicates a non-printing nozzle. The printing head is positioned at A1 over subpixel row 1, at the first edge of the workpiece. The printer prints across the workpiece in the row direction to form rows of red in subpixel rows 1, 7, 13, and 19, and rows of green in subpixel rows 3, 9, 15, and 21. This is shown in the column labeled Print #1. As in FIG. 3, only one subpixel is shown for each color for purposed of clarity, but each represents an entire row of subpixels. The printer then shifts laterally by a distance $d_1$ which is $n_3$ subpixel units. In this case $n_3$=3. This is position A2 for the printer. The printer then prints a second set of rows: red in subpixel rows 4, 10, 16, and 22, and rows of green in subpixel rows 6, 12, 18, and 24. This is shown in the Print #2 column. Print #2 is shown shifted to the right of Print #1 for purposes of clarity. Both Print #1 and Print #2, as well as all the other Print numbers, represent full rows of printed subpixels across the workpiece.

At this point, the printer has printed two sets of twelve rows of subpixels, including the non-printing nozzles. This is $n_2$ sets of z subpixel rows. The printing head is then moved laterally by a distance $d_2$, where $d_2$=$n_2$zs, which is equal to 24 subpixel units in this illustration. The new position is the second printing position, B1, where:

$$B1=A1+24=25.$$

The printer then prints two more sets of 12 rows of subpixels as shown in Print #3-4.

The printing head is then again moved laterally by a distance $d_2$ which is 24 subpixel units. The new position is the third printing position, C1, where:

$$C1=B1+24=49.$$

The printer then prints two more sets of 12 rows of subpixels as shown in Print #5-6.

The printed outcome is shown in the column labeled "Pattern". It can be seen that the only subpixels that are missing are in the non-printing rows: subpixel rows 2, 5, 8, etc. Thus the entire workpiece will be usable when the third color is added. Although red and green are exemplified in this figure, other colors could be used.

4. ELECTRONIC DEVICE

Devices for which the printing method described herein can be used include organic electronic devices. The term "organic electronic device" or sometimes just "electronic device" is intended to mean a device including one or more organic semiconductor layers or materials. An organic electronic device includes, but is not limited to: (1) a device that converts electrical energy into radiation (e.g., a light-emitting diode, light emitting diode display, diode laser, or lighting panel), (2) a device that detects a signal using an electronic process (e.g., a photodetector, a photoconductive cell, a photoresistor, a photoswitch, a phototransistor, a phototube, an infrared ("IR") detector, or a biosensors), (3) a device that converts radiation into electrical energy (e.g., a photovoltaic device or solar cell), (4) a device that includes one or more electronic components that include one or more organic semiconductor layers (e.g., a transistor or diode), or any combination of devices in items (1) through (4).

In such devices, an organic active layer is sandwiched between two electrical contact layers. At least one of the electrical contact layers is light-transmitting so that light can pass through the electrical contact layer. The organic active layer emits light through the light-transmitting electrical contact layer upon application of electricity across the electrical contact layers. Additional electroactive layers may be present between the light-emitting layer and the electrical contact layer(s).

It is well known to use organic electroluminescent compounds as the active component in such devices to provide the necessary colors. The printing method described herein is suitable for the printing of liquid compositions containing electroluminescent materials having different colors. Such materials include, but are not limited to, small molecule organic fluorescent compounds, fluorescent and phosphorescent metal complexes, conjugated polymers, and mixtures thereof. Examples of fluorescent compounds include, but are not limited to, pyrene, perylene, rubrene, coumarin, anthracenes, thiadiazoles, derivatives thereof, and mixtures thereof. In some cases these small molecule materials are present as a dopant in a host material to improve processing and/or electronic properties. Examples of metal complexes include, but are not limited to, metal chelated oxinoid compounds and cyclometalated iridium and platinum electroluminescent compounds. These complexes may also be present as a dopant in a charge carrying host material. Examples of conjugated polymers include, but are not limited to poly (phenylenevinylenes), polyfluorenes, poly(spirobifluorenes), polythiophenes, poly(p-phenylenes), copolymers thereof, and mixtures thereof.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. A method of printing a regular array of rows of electrically active subpixels on a workpiece for use in an organic electronic device, wherein the subpixels are capable of emitting light having c different colors and having a subpixel pitch s, said method comprising:
   (a) providing a printing head having z nozzles arranged in a row with a spacing p, where $z=n_1(c)$ and $p=n_2(s)$, the printing head being at a first position relative to the workpiece;
   (b) providing c different color printing inks to the printing head, one color printing ink for each of the c colors, and wherein each color printing ink contains an electroluminescent material;
   (c) supplying each nozzle on the printing head with color printing ink in an alternating pattern, wherein adjacent nozzles on the printing head are not supplied the same color;
   (d) dispensing said color printing ink from the z nozzles to print a first set of z rows of subpixels with the printing head;
   (e) moving the workpiece laterally relative to the printing head by a distance $d_1$, where $d_1=n_3(s)$;
   (f) dispensing said color printing ink from the nozzles to print a second set of z rows of subpixels with the printing head; and
   (g) repeating steps (e) and (f) for a total of $n_2$ sets of z rows of subpixels;
where:
c is an integer greater than 1;
   $n_1$, $n_2$, and $n_3$ are the same or different and are independently selected from integers greater than 0, with the proviso that $n_2$ is not a multiple of c.

2. The method of claim 1, further comprising moving the workpiece laterally relative to the printing head to a second printing position, wherein the printing head is moved by a distance of $d_2$ from the first printing and $d_2=n_2zs$, and repeating steps (d) through (g).

3. The method of claim 1, wherein c=2, 3, or 4.

4. The method of claim 1, wherein $n_1$ is at least 2.

5. The method of claim 1, wherein $n_2=c+1$.

6. The method of claim 1, wherein $n_3=n_4c$, where $n_4$ is an integer greater than 0.

7. The method of claim 1, wherein c=2, $n_1$=4-8, $n_2$=3, and $n_3$=2.

8. The method of claim 1, wherein c=3, $n_1$=3-5, $n_2$=4, and $n_3$=3.

9. The method of claim 1, wherein c=4, $n_1$=2-4, $n_2$=5, and $n_3$=4.

10. The method of claim 1 wherein the dispensing steps (d) and (f) are performed in a continuous spray for each set of z rows of subpixels.

* * * * *